(12) United States Patent
Enders et al.

(10) Patent No.: US 7,983,250 B2
(45) Date of Patent: Jul. 19, 2011

(54) METHOD AND COMMUNICATIONS SYSTEM FOR TRANSMITTING INFORMATION IN A MOTOR VEHICLE

(75) Inventors: Thorsten Enders, Illingen (DE); Thomas Fuehrer, Gerlingen (DE); Robert Hugel, Karlsruhe (DE); Juergen Schirmer, Heidelberg (DE); Dieter Kraft, Gerlingen (DE); Frank Stiegler, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 474 days.

(21) Appl. No.: 10/590,392

(22) PCT Filed: Feb. 1, 2005

(86) PCT No.: PCT/EP2005/050435
§ 371 (c)(1),
(2), (4) Date: Jun. 8, 2007

(87) PCT Pub. No.: WO2005/081463
PCT Pub. Date: Sep. 1, 2005

(65) Prior Publication Data
US 2007/0286225 A1    Dec. 13, 2007

(30) Foreign Application Priority Data
Feb. 24, 2004 (DE) .......... 10 2004 008 910

(51) Int. Cl.
*H04L 12/50* (2006.01)
*H04Q 11/00* (2006.01)

(52) U.S. Cl. ......... 370/362; 370/364; 710/117; 710/305

(58) Field of Classification Search .......... 370/357, 370/362, 364, 366; 701/29; 710/1, 48, 106, 710/117, 260, 300, 305
See application file for complete search history.

(56) References Cited

U.S. PATENT DOCUMENTS 4,583,232 A * 4/1986 Howell .......... 375/222
4,709,376 A * 11/1987 Kage .......... 714/822
(Continued)

FOREIGN PATENT DOCUMENTS
DE    101 42 408    4/2003
(Continued)

OTHER PUBLICATIONS

"Fault Tolerant TTCAN Networks", B. Muller, T. Fuhrer, F. Hartwich, R. Hugel, H. Weiler, Robert Bosch GmbH; Proceedings ICC 2002, 8th International CAN Conference; Feb. 26, 2002. [url: http://www.semiconductor.bosch.de/de/20/can/3-literature.asp].*

(Continued)

*Primary Examiner* — Aung S Moe
*Assistant Examiner* — Benjamin Elliott
(74) *Attorney, Agent, or Firm* — Kenyon & Kenyon LLP

(57) ABSTRACT

A communications system for a motor vehicle, including a plurality of electrical components, a data bus structure to which the components are connected in order to transmit information among the components, and a power line structure to which the components are connected in order to be supplied with power. The information is transmitted in successive cycles over the data bus structure, each cycle including at least one time window for transmitting information at specific points in time and at least one event window for transmitting information in response to specific events. The communications system includes an arrangement for redundantly transmitting information which merely transmits the information transmitted in the at least one time window over the data bus structure at least partially over the power line structure as well.

11 Claims, 3 Drawing Sheets

U.S. PATENT DOCUMENTS

| | | | |
|---|---|---|---|
| 4,931,964 A * | 6/1990 | Titsworth et al. | 700/279 |
| 5,521,588 A * | 5/1996 | Kuhner et al. | 340/825.22 |
| 5,592,383 A * | 1/1997 | Rogers et al. | 455/456.1 |
| 5,752,748 A * | 5/1998 | Schramm et al. | 303/20 |
| 5,838,995 A * | 11/1998 | Chen et al. | 710/60 |
| 6,098,296 A * | 8/2000 | Perisho et al. | 33/203 |
| 6,122,273 A * | 9/2000 | Cantwell et al. | 370/359 |
| 6,157,887 A * | 12/2000 | Zittlau | 701/70 |
| 6,229,434 B1 * | 5/2001 | Knapp et al. | 340/310.16 |
| 6,299,261 B1 * | 10/2001 | Weiberle et al. | 303/20 |
| 6,404,326 B1 * | 6/2002 | Timmerman et al. | 340/286.01 |
| 6,469,404 B1 * | 10/2002 | Pohjola | 307/10.1 |
| 6,512,307 B1 * | 1/2003 | Ilg | 307/9.1 |
| 6,559,757 B1 * | 5/2003 | Deller et al. | 370/206 |
| 6,580,991 B2 * | 6/2003 | Disser et al. | 701/48 |
| 6,621,830 B1 * | 9/2003 | Semple et al. | 370/468 |
| 6,690,305 B2 * | 2/2004 | Meroth et al. | 341/63 |
| 6,917,890 B2 * | 7/2005 | Davis et al. | 702/85 |
| 6,988,026 B2 * | 1/2006 | Breed et al. | 701/29 |
| 7,183,896 B2 * | 2/2007 | Qualich et al. | 340/5.72 |
| 7,359,775 B2 * | 4/2008 | Strege et al. | 701/29 |
| 7,430,261 B2 * | 9/2008 | Forest et al. | 375/364 |
| 7,493,439 B2 * | 2/2009 | Gower et al. | 710/305 |
| 2001/0021196 A1 * | 9/2001 | Weigl et al. | 370/444 |
| 2002/0167398 A1 * | 11/2002 | Strasser | 340/425.5 |
| 2003/0076221 A1 * | 4/2003 | Akiyama et al. | 340/310.01 |
| 2004/0081193 A1 * | 4/2004 | Forest et al. | 370/458 |
| 2004/0153223 A1 * | 8/2004 | Fujita et al. | 701/29 |
| 2006/0156127 A1 * | 7/2006 | Harter et al. | 714/732 |
| 2007/0286225 A1 * | 12/2007 | Enders et al. | 370/438 |
| 2008/0140949 A1 * | 6/2008 | Hartwich et al. | 711/154 |
| 2010/0002753 A1 * | 1/2010 | Lucas et al. | 375/145 |

FOREIGN PATENT DOCUMENTS

| | | |
|---|---|---|
| DE | 101 42 409 | 4/2003 |
| DE | 101 42 410 | 4/2003 |
| EP | 1355456 | 10/2003 |
| EP | 1355456 A1 * | 10/2003 |
| JP | 2003-318925 | 11/2003 |
| WO | WO03/028305 | 4/2003 |
| WO | WO 03/036877 | 5/2003 |

OTHER PUBLICATIONS

Müller, B. et al. "Fault Tolerant TTCAN Networks" Proceedings ICC 2002, 8$^{th}$ International CAN Conference, 'Online! Feb. 26, 2002.

Dohmke, T. "Bussysteme im Automobil CAN, FlexRay und MOST" Technische Universitat Berlin, 'Online! Mar. 2002, pp. 1-22.

Fonseca, J.A. et al.: DISCO-Distributed Embeddable Systems for Control Applications: Project Overview.

Führer, T. et al., "Time Triggered Communication on CAN (Time Triggered CAN-TTCAN)".

Hartwich, F. et al., "CAN Network with Time Triggered Communication".

Fonseca, J. et al., "Scheduling for a TTCAN Network with a Stochastic Optimization Algorithm".

ISO 11898-1, International Standard, First Edition Dec. 1, 2003 "Road Vehicles—Controller Area Network (CAN)-Part 1: Data Link Layer and Physical Signalling", 2003.

ISO 11898-2, International Standard, First Edition Dec. 1, 2003 "Road Vehicles—Controller Area Network (CAN)-Part 2: High-Speed Medium Access Unit", 2003.

ISO 11898-3, International Standard, First Edition "Road Vehicles—Controller Area Network (CAN)-Part 3: Low-Speed, Fault-Tolerant, Medium Dependent Interface", 2005.

ISO 11898-4, International Standard, First Edition Aug. 1, 2004 "Road Vehicles—Controller Area Network (CAN)-Part 4: Time-Triggered Communication", 2004.

* cited by examiner

Fig. 3

| column | 0 | 1 | 2 | 3 | 4 | 5 | 6 | 7 | |
|---|---|---|---|---|---|---|---|---|---|
| row 0 | Ref. | $N_1$ | $N_3$ | V | F | $N_4$ | $N_3$ | $N_2$ | } 15 |
| 1 | Ref. | $N_1$ | $N_6$ | $N_5$ | $N_6$ | $N_5$ | $N_3$ | $N_6$ | } 16 |
| 2 | Ref. | $N_1$ | V | V | $N_7$ | $N_4$ | $N_3$ | $N_2$ | } 17 |
| 3 | Ref. | $N_1$ | V | $N_5$ | $N_6$ | $N_5$ | $N_3$ | $N_6$ | } 18 |

14

METHOD AND COMMUNICATIONS SYSTEM FOR TRANSMITTING INFORMATION IN A MOTOR VEHICLE

BACKGROUND INFORMATION

The present invention is directed to a method for transmitting information in a motor vehicle among electrical components of the motor vehicle. The components are connected to a data bus structure of the motor vehicle in order to transmit information and to a power line structure of the motor vehicle in order to be supplied with power. The information is transmitted via the data bus structure in successive cycles. Each cycle includes at least one time window for transmitting information at specific points in time and at least one event window for transmitting information in response to specific events.

The present invention is also directed to a method for transmitting information in a motor vehicle among electrical components of the motor vehicle, in that the information is transmitted, at least in part, both via the data bus structure as well as via the power line structure, in order to provide redundant information transmission.

In addition, the present invention is directed to a communications system for a motor vehicle. The communications system includes a plurality of electrical components, a data bus structure to which the components are connected in order to transmit information among the components, and a power supply structure to which the components are connected in order to be supplied with power. The information is transmitted over the data bus structure in successive cycles, each cycle including at least one time window for transmitting information at specific points in time and at least one event window for transmitting information in response to specific events.

The present invention is also directed to a communications system for a motor vehicle. The communications system includes a plurality of electrical components, a data bus structure to which the components are connected in order to transmit information among the components, and a power supply structure to which the components are connected in order to be supplied with power. In the communications system, the information is transmitted, at least in part, both via the data bus structure as well as via the power line structure.

In motor vehicles, electrical components are increasingly being used which communicate with one another via a data bus structure for purposes of transmitting information. The electrical components are connected to a power supply line structure in order to be supplied with power. The electrical components are sensors, actuators and/or control units, for example. Moreover, in motor vehicles, even those functions implemented using conventional methods, at least in part, as mechanical functions due to safety considerations or for other reasons, are increasingly being realized as electrical functions. For example, if previously the commands were transmitted from a gas pedal via a Bowden cable to a throttle valve or to a control unit of the internal combustion engine, today, this function is typically realized as an electronic function, a sensor recording the position of the gas pedal, a transducer converting the sensor signals into corresponding electrical signals, which are then transmitted via a data-transmission line to the throttle valve or to the control unit of the internal combustion engine and are further processed there. The control signals are retransmitted by the control unit to a fuel injection system and/or to gas exchange valves (intake/discharge valves) of the internal combustion engine. The actual activation of the throttle valve, of the injection system and/or of the gas exchange valves is handled by suitable actuators, which are driven by the control signals (so-called throttle-by-wire). All of the so-called X-by-wire functions, such as brake-by-wire, steer-by-wire, shift-by-wire, etc., work in a similar fashion in a motor vehicle, in which case, functions conventionally implemented, at least in part, as mechanical functions, are realized exclusively as electrical functions.

To keep the outlay for wiring among the individual electrical components in the motor vehicle to a minimum, the electrical components are typically interconnected via data bus structures, via which information, for example measurement signals, control signals, status information, etc., can be transmitted in accordance with specific communication protocols. Since the trend is for fewer and fewer motor vehicle functions to be implemented as mechanical functions, there is a marked increase, on the one hand, in the amount of information to be transmitted in the motor vehicle communications systems and, on the other hand, in the requirement for the security of the information transmitted over the data bus structure.

An important safety aspect to be considered when transmitting information in a motor vehicle is, on the one hand, that the information be transmitted at all events over the data bus structure and reach its receiver at all events and not be lost, for example due to an overloading of or a defect in the data bus structure, or by arriving at the wrong receiver. In order to allow for this safety requirement, in conventional communications systems for motor vehicles the information is not only transmitted over the data bus structure, but also redundantly over the power line structure. The transmission of information via the power line structure is also referred to as power line communications (PLC). The design and method of functioning of such communications systems, as well as the topology and the requisite conditioning of the power line structure are described in the German Patent Applications DE 101 42 408 A1, DE 101 42 409 A1 and DE 101 42 410 A1.

On the other hand, an important safety aspect is that the transmitted information not only reach the correct receiver with certainty, but also within a specifiable transmission time. To be able to fulfill this safety requirement, many different communication protocols have been developed in the past. Some of these are briefly described in the following.

Such a communication protocol for transmitting information within the framework of safety-critical applications is, for example, the Time Triggered Controller Area Network (TTCAN) protocol. The TTCAN protocol is based on the Controller Area Network (CAN) data link layer, which is specified in ISO 11898-1. The TTCAN protocol can make use of the standardized CAN physical layers, as are specified for high-speed transmitting/receiving units in ISO 11898-2 and for fault-tolerant, low-speed transmitting/receiving units in ISO 11898-3. The mechanisms provided by the TTCAN protocol render possible both the time-controlled, as well as the event-controlled transmission of messages. This enables CAN-based networks to be used in safety-critical environments (for example in a closed-loop control circuit). Another benefit derived from the TTCAN protocol is the improvement in the real-time performance in CAN-based networks.

The ISO (International Standardization Organization) has specified the TTCAN protocol in ISO 11898-4. In this specification, in one communication cycle (basic cycle), there are three different types of time frames during which messages can be transmitted: exclusive time windows, arbitrating time windows, and free time windows. In the arbitrating time windows, a plurality of messages can compete for access to the data bus structure. The exclusive time windows are assigned to a specific message, which is periodically transmitted to the data bus structure without competing for the access rights. Thus, the exclusive time windows correspond to the time windows along the lines of the present invention.

In order to be compatible with the time-controlled communication, all of the components (network nodes) have a common time base, which is made available either by an internal or an external timing element. An event-controlled information transmission in a manner characteristic of CAN is possible in the arbitrating time windows. Thus, this corresponds to the event windows in accordance with the present invention. The free time windows make it possible for the communications system to be subsequently expanded in a relatively simple manner. A cycle for transmitting information begins with a reference message which synchronizes the components. The automatic retransmission of those messages which had not been able to be successfully transmitted, as is characteristic of CAN, is deactivated.

In accordance with the TTCAN protocol, information is transmitted in periodically repeating cycles, each cycle having at least one time window (exclusive time window), in which specified messages are able to be transmitted at specific points in time within the cycle. Moreover, each cycle includes at least one event window (arbitrating time window) which can be used for an event-controlled transmission of information. Thus, in the case of the TTCAN protocol, an event-controlled approach is integrated into the time-controlled approach for data transmission of the CAN. This makes it possible for the communication employed in the TTCAN data bus structure to behave deterministically; i.e., for a conclusion to be reached regarding the transmission time of a message. Therefore, the TTCAN protocol is very well suited for use in safety-critical systems. Additional information on the TTCAN protocol can be obtained from a multiplicity of publications, for example on the Internet at http://212.114.78.132/can/ttcan/ including publications by Führer, T. et al.: "Time-Triggered Communication on CAN," by Hartwich, F. et al.: "CAN Network With Time-Triggered Communication," and by Fonseca, J. et al.: "Scheduling for a TTCAN Network with a Stochastic Optimization Algorithm."

Another communication protocol, which is suited for use in safety-critical environments, is the FlexRay protocol. At the forefront of the FlexRay development were, above all, the requirements for a high data transmission rate, a deterministic communication, a high error tolerance and flexibility. In accordance with the FlexRay protocol, the information is transmitted in successive communication cycles. A shared understanding of time is provided in the electrical components (network nodes), the components being synchronized by reference messages (so-called SYNC messages) within one cycle. To render possible both a synchronous, as well as an asynchronous transmission of messages, the communication cycle is divided into a static segment and a dynamic segment, which each have at least one window (slot or time slot) for transmitting information.

The slots of the static segment are assigned to specific messages, which are periodically transmitted to the FlexRay data bus structure at specific points in time, without competing for the access rights. In this respect, the slots of the static segment correspond to the time windows along the lines of the present invention. An event-controlled information transmission can be realized in the slots of the dynamic segment. In this respect, the slots of the dynamic segment correspond to the event windows along the lines of the present invention.

While in accordance with the Time Division Multiple Access (TDMA) method, the FlexRay data bus structure is accessed during the static segment of the cycle, in accordance with the so-called Flexible Time Division Multiple Access (FTDMA) method, the bus structure is accessed during the dynamic segment of the cycle. A so-called minislotting method is used to access the data bus structure during the dynamic segment of the cycle. At the present time, there is still no standard, such as an ISO standard, for the FlexRay protocol. Details described here regarding the protocol could also possibly change in the future. Additional information on the FlexRay protocol can be obtained from the Internet at http://www.flexray.de, which includes, inter alia, several publications that are accessible to all.

Another communication protocol that is suited for safety-critical environments is the Time-Triggered Communication Protocol (TTP), in particular, version C (TTP/C) of this protocol. In the case of TTP, information is transmitted in successive cycles (rounds). Each cycle includes a plurality of windows (slots) for transmitting information. One portion of the windows is used for the guaranteed, deterministic transmission of real-time data. This portion of the windows (slot for state data) corresponds to the time windows along the lines of the present invention. Moreover, one portion of the window is reserved for event-controlled information transmission, the event-controlled messages being transmitted piggyback on the TTP data frame. This portion of the windows (slot for event data) corresponds to the event windows along the lines of the present invention. Additional information can be obtained on the Internet, on the home page of the firm TTTech Computertechnik AG, Vienna, Austria, at http://www.tttech.com/technology/articles.htm, which includes several publications on the subject of TTP that are accessible to all.

Within the framework of the so-called DISCO (Distributed Embeddable Systems for Control Applications) project at the University of Aveiro, Portugal, a new MAC (Medium Access Control) protocol was developed and designed as the FTT-CAN (Flexible Time-Triggered Controller Area Network) protocol. The FTT-CAN protocol is suited for use in safety-critical environments. The FTT-CAN protocol is very similar to the TTCAN protocol and is generally distinguished from it by the type of sequence coordination (so-called scheduling) of the information transmission. Also, in accordance with the FFT-CAN protocol, the information is transmitted in successive cycles, each cycle including time windows for the time-controlled transmission of information and event windows for the event-controlled transmission of information. The DISCO project involves many Portuguese research institutes, inter alia, the Instituto de Engenharia Elektronica e Telematica de Aveiro (IEETA) of the Universidade de Aveiro, Portugal. More detailed information on the FTT-CAN protocol can be obtained on the Internet, in particular from the publication Fonseca, J. A. et al.: DISCO-Distributed Embeddable Systems for Control Applications: Project Overview, at http://www.ieeta.pt/~jaf/papers/ano2001/DISCO.pdf.

Another communication protocol for use in safety-critical environments is the Media Oriented Systems Transport (MOST) protocol, in which information is likewise transmitted in successive cycles (frames). Each cycle includes time windows (synchronous area) for the time-controlled transmission of information and event windows (asynchronous area) for the event-controlled transmission of information. Additional information on the MOST protocol can be obtained from the Internet, for example at http://www.most-cooperation.com, the MOST technology being explained in detail in many publications that are accessible to all.

In addition to the above specifically mentioned and briefly described communication protocols for use in safety-critical environments, there are still other communication protocols, or there will still be others in the future, in which the information is transmitted in successive cycles, each cycle including time windows for the time-controlled transmission of information and event windows for the event-controlled transmission of information, which are thus likewise suited for use in safety-critical systems.

Common to these communication protocols is the type of information transmission. For example, information that occurs at unpredictable points in time is transmitted in the event windows. Such information includes, for example, sensor measurement signals, alarm or error messages of a control unit, manually triggerable signals (signals for controlling comfort and convenience functions in the motor vehicle), etc. On the other hand, safety-critical and time-critical information is typically transmitted in the time windows of the cycles. This makes it possible to ensure that the transmitted information is transmitted within a specifiable transmission time and is also actually transmitted to the receiver and received by the same. For that reason, when working with the communication protocols for safety-critical applications, it is vitally important that precisely that information transmitted in the time windows also actually arrive at the receiver. A defect in the data bus structure, which could adversely affect or even entirely prevent a transmission of information, would have disastrous consequences for safety in the context of the safety-critical applications.

For that reason, in spite of damage to or failure of a data bus structure, a relatively substantial outlay is expended to nevertheless enable information to be transmitted among the components connected to the data bus structure. A multiple-redundant design of the data bus structure would be possible, for example. However, this is very complicated and expensive, since additional data bus structures, as well as additional transmitting/receiving units are required for connecting the components to the additional data bus structures. Another drawback inherent in motor vehicles in particular, is the additional space required for the additional data bus structures, as well as for the additional transmitting/receiving units of the components. This additionally required space is either not available in motor vehicles or could be made available more effectively to the motor vehicle occupants, either by increasing the size of the passenger compartment or of the trunk.

SUMMARY

An object of the present invention is to devise a simple, cost-effective, and space-saving method for redundantly transmitting information in a communications system for a motor vehicle, while taking into account the special demands placed on the transmission of information within the framework of safety-critical applications.

To achieve this objective, in accordance with one example embodiment of the present invention, it is provided that merely the information transmitted in the at least one time-specified time window over the data bus structure also be at least partially transmitted over the power line structure for purposes of redundant information transmission.

According to an embodiment of the present invention, the information may be transmitted in successive cycles over the data bus structure, each cycle including at least one time-specified time window for transmitting information at specific points in time and at least one event-defined event window for transmitting information in response to specific events, and that at least one portion of merely the information transmitted in the at least one time window over the data bus structure be transmitted over the power line structure.

In accordance with an example embodiment of the present invention that, in addition to the data bus structure, the power line structure of the motor vehicle, which supplies power to the components of the data bus structure, may also be used for redundantly transmitting information. To be able to keep the amount of information to be transmitted over the power line structure to a minimum; however, not all information transmitted over the data bus structure need also be transmitted over the power line structure, but rather merely the safety-critical and/or time-critical information, which is typically transmitted in the time windows of the transmission cycles over the data bus structure.

Disturbances are present on the power line structure which can ultimately impair the data transmission. It is, in fact, possible to also achieve very high data transmission rates over a power line structure by suitably conditioning the power line structure and/or by implementing appropriate measures in the electrical components or in the transceivers of the components. At the present time, data transmission rates of up to 10 Mbaud are attainable over the power line structure. Often however, it may suffice for a motor vehicle to be provided with a simple and cost-effectively developed fallback system for data transmission in the case of a failure of the data bus structure, in order to guarantee an emergency operation, for example. To that end, it may suffice when only one portion of the data transmitted over the data bus structure is transmitted over the power line structure. Such a low data transmission rate over the power line structure may already be achieved using simple means, i.e., for example, using a few conditioned supply networks, while entailing little outlay in the transceivers. Thus, in accordance with the present invention, it is possible to have a simply designed and cost-effective fallback system for transmitting data over the power line structure.

Thus, in accordance with an example embodiment of the present invention, not all time windows must also be transmitted over the power line structure. Rather, it is also possible that merely a portion of the information transmitted in the time windows is also transmitted redundantly over the power line structure. In any case, the information transmitted over the data bus structure in the event windows is not transmitted redundantly over the power line structure. It is not ruled out, however, for another type of redundant data transmission to be provided for this information.

A communications system for implementing the method according to the present invention for transmitting information is able to be implemented in an especially simple and cost-effective manner. Moreover, no additional installation space is needed for an additional redundant data bus structure, since the components are interconnected in any event via the data bus structure and the power line structure. It is merely necessary to have additional transmitting/receiving units for connecting the components to the power line structure for purposes of transmitting information.

In accordance with one advantageous refinement of the present invention, the information is transmitted over the data bus structure in accordance with the Time-Triggered Controller Area Network (TTCAN) protocol. In accordance with the TTCAN protocol, the time windows are designated as "exclusive windows" and the event windows as "arbitrating windows." Thus, in accordance with an embodiment of the present invention, the information transmitted in accordance with the TTCAN protocol in the "exclusive windows" over the data bus structure is at least partially transmitted as well over the power line structure for purposes of redundantly transmitting information.

Another specific embodiment of the present invention provides for the information to be transmitted over the data bus structure in accordance with the FlexRay protocol. In the FlexRay protocol, the time windows are referred to as the "static segments" and the event windows as the "dynamic segments" of the communication cycle. Thus, in accordance with the present invention, the information transmitted in accordance with the FlexRay protocol in the "static segments" over the data bus structure is at least partially transmitted over the power line structure as well.

Another specific embodiment of the present invention provides for the information to be transmitted over the data bus structure in accordance with the Time-Triggered Protocol (TTP). In the TTP, the time windows are described as the portion of the slot (transmission frame) which is used for transmitting state data. The event window is described as the portion of the slot which is used for transmitting event data. Thus, in accordance with the present invention, pursuant to the TTP, the information transmitted in the portion of the slot provided for transmitting the state data is at least partially transmitted as well over the power line structure.

In one embodiment of the present invention, the communications system includes an assignment for redundantly transmitting information which merely transmits the information transmitted in the at least one time window over the data bus structure at least partially over the power line structure as well.

In another example embodiment of the present invention, it is also provided that the information be transmitted in successive cycles over the data bus structure, each cycle including at least one time window for transmitting information at specific points in time and at least one event window for transmitting information in response to specific events, and that the communications system include an arrangement for redundantly transmitting information which transmits at least one portion of merely the information transmitted in the at least one time window over the data bus structure over the power line structure as well.

In embodiments of the present invention, a communications system is provided which includes a plurality of electrical components, which are interconnected in order to supply power over a power line structure and, moreover, for transmitting information over a data bus structure. In the communications system, the information is transmitted over successive communication cycles, each cycle having at least one time window for the time-controlled transmission of information and at least one event window for the event-controlled transmission of information. A communications system of this kind is, for example, a TTCAN communications system, a FlexRay communications system, or a TTP/C communications system. Starting our from such a communications system, it is provided that information to be transmitted among the components not only be transmitted over the data bus structure, but, additionally, over the power line structure as well. In this context, not all information transmitted over the data bus structure need also be transmitted over the power line structure, but rather merely the safety-critical and/or time-critical information, which is transmitted in the time windows of the communication cycles.

In example embodiments of the present invention, a communications system is provided which includes a plurality of electrical components which are connected to a power line structure in order to be supplied with power and to a data bus structure in order to transmit information. Within the communications system, the information is transmitted, at least in part, both via the data bus structure as well as via the power line structure. Such a communications system is described, for example, in German Patent Application DE 101 42 408 A1, which describes a communications system, in which the information is transmitted both over the data bus structure, as well as over the power line structure. A data transmission of this kind is also referred to as Powerline Communications (PLC), which signifies data transmission over the power line structure. In contrast to the conventional communications system, in accordance with the present invention, the information is transmitted over the data bus structure in successive cycles, each cycle including at least one time window for the time-controlled transmission of information and at least one event window for the event-controlled transmission of information. Moreover, in accordance with the present invention, not all information transmitted over the data bus structure need also be transmitted over the power line structure, but rather merely the safety-critical and/or time-critical information, which is transmitted within the time windows over the data bus structure.

In accordance with various advantageous refinements of the communications system according to the present invention, the information is transmitted over the data bus structure in accordance with the Time-Triggered Controller Area Network (TTCAN) protocol, the FlexRay protocol, and/or the Time-Triggered Protocol (TTP), in particular in accordance with version C of the TTP protocol (TTP/C).

BRIEF DESCRIPTION OF THE DRAWINGS

Other features, possible applications, and advantages of the present invention may be derived from the following description of exemplary embodiments of the present invention, which are illustrated in the figures. In this context, all features described or shown constitute the subject matter of the present invention, either alone or in any combination, irrespective of how they are combined in the description and figures.

FIG. 3 shows a TTCAN system matrix.

DETAILED DESCRIPTION OF EXAMPLE EMBODIMENTS

Figure 1:
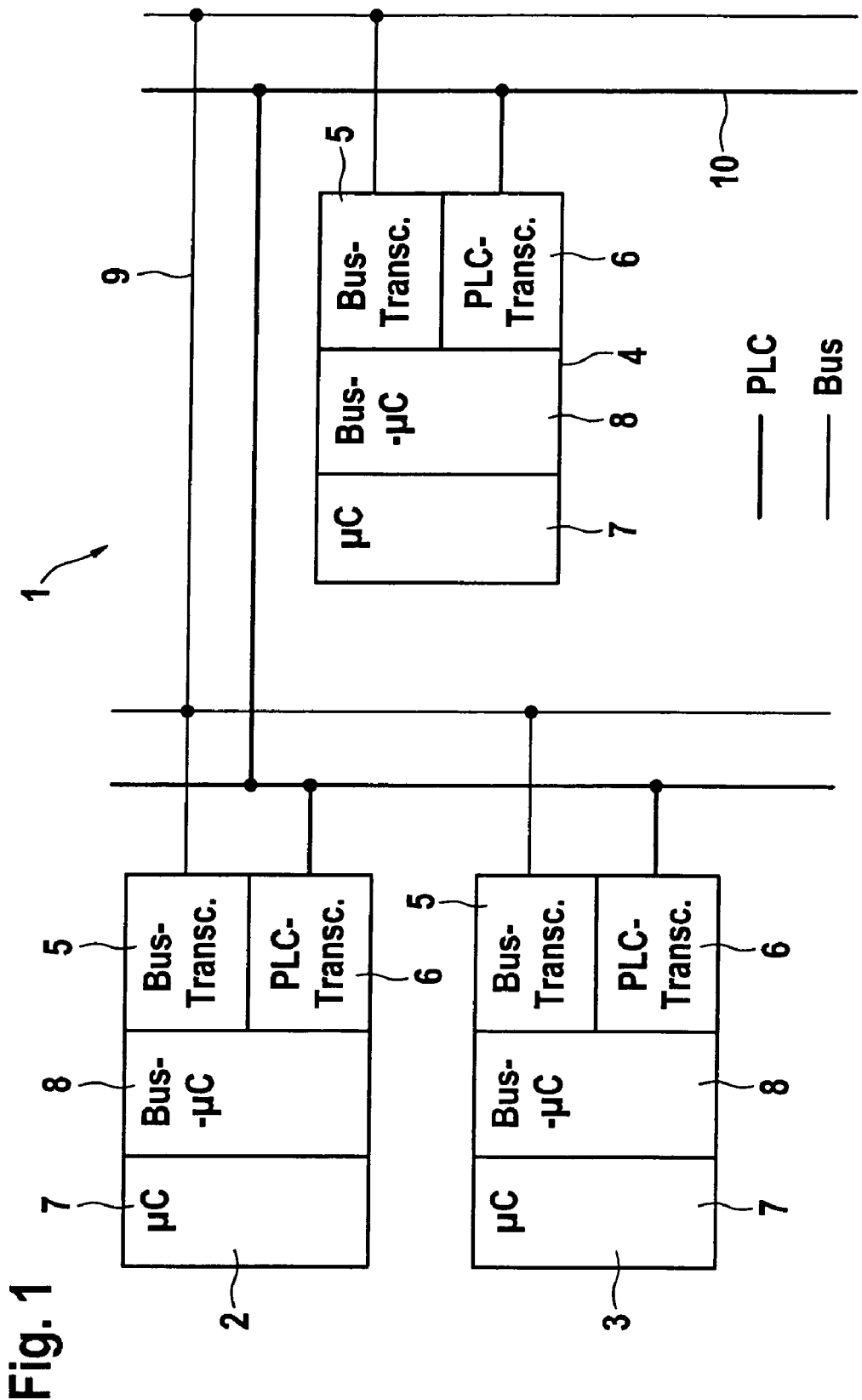
FIG. 1 shows a communications system according to the present in accordance with one preferred specific embodiment.

In FIG. 1, a communications system according to an example embodiment of the present invention is denoted by reference numeral 1. Communications system 1 includes a plurality of electrical components 2, 3, 4 of a motor vehicle. Electrical components 2, 3, 4 are, for example, control units for any given motor vehicle functions, in particular control units for safety-critical applications in a motor vehicle, such as for an internal combustion engine, a drive train, a braking system, or any given other so-called X-by-wire applications. Hydraulic, pneumatic, or any other given electrically controllable components are designated as electrical components 2, 3, 4.

In addition, communications system 1 encompasses a data bus structure 9, to which components 2, 3, 4 are connected in order to transmit information among components 2, 3, 4. The information is transmitted in successive cycles over data bus structure 9. Each cycle includes at least one time window for the time-controlled transmission of time-critical and/or safety-critical information and/or safety-critical information and at least one event window for the event-controlled transmission of information. Such data bus structures are generally conventional. The information is transmitted over conventional data bus structures, for example, in accordance with the FlexRay protocol, TTCAN (Time Triggered Controller Area Network) protocol, MOST (Media Oriented Systems Transport) protocol or, in accordance with the TTP (Time Triggered Protocol), in particular in accordance with the TTP/C protocol. Moreover, components 2, 3, 4 are connected to a power line structure 10, via which components 2, 3, 4 are supplied with electrical power.

In accordance with an example embodiment of the present invention, the information transmitted among components 2, 3, 4 of communications system 1 is not only transmitted over data bus structure 9, but partially over power line structure 10 as well. It is merely that information which is transmitted within the time windows over data bus structure 9 which is also transmitted over the power line structure. This is typically the time-critical and/or safety-critical information, which is required, for example, for the proper operation of X-by-wire applications. Information that is not as safety-critical, such as from comfort and convenience functions of the motor vehicle or occasionally occurring sensor signals, is transmitted, on the other hand, within the event windows merely over data bus structure 9, not, however, over power line structure 10 as well.

Thus, the present invention provides a simply designed and cost-effective communications system 1, in which information is transmitted in a partially redundant process over data bus structure 9 and over power line structure 10, in order to maintain safety-critical functions. However, only that information which is absolutely required for a proper functioning of the safety-critical application is also transmitted over power line structure 10. As a result, even in the event of failure of data bus structure 9, a proper functioning of the safety-critical application may still be ensured in the motor vehicle, even when it is only a question of an emergency-operation function.

By limiting the information transmitted over power line structure 10 to the safety-critical information that is transmitted within the time windows over data bus structure 9, the data volume of the information to be transmitted over power line structure 10 is reduced. This makes it possible to reduce the transmission rate for power line structure 10 relative to the transmission rate for data bus structure 9, without any loss of information. This may be necessary, particularly when, due to disturbances in power line structure 10, the maximum attainable transmission rate over this structure is lower than the transmission rate that is attainable over data bus structure 9. The transmission of information over power line structure 10 is also referred to as Powerline Communications (PLC).

Motor vehicle components 2, 3, 4 include a bus transceiver 5 for transmitting information to other electrical components 2, 3, 4 via data bus structure 9 and for receiving information from other electrical components 2, 3, 4 via data bus structure 9. Moreover, components 2, 3, 4 each include a PLC transceiver 6 for transmitting information to other electrical components 2, 3, 4 via power line structure 10 and for receiving information from other electrical components 2, 3, 4 via power line structure 10. In addition, components 2, 3, 4 include a computing element 7, i.e., a microprocessor or microcontroller, onto which a control program may be loaded for executing the functions, for example the control or regulation functions of components 2, 3, 4. Finally, components 2, 3, 4 include another computing element 8 for controlling the transmission of information of transmitting/receiving units (transceivers) 5 and 6. Additional computing element 8 is used for relieving computing element 7. However, the two computing elements 7 and 8 may also be combined into one single, shared computing element. Computing element 8 is typically referred to as a communication controller and computing element 7 as a host (for the applications). This is based on the philosophy that a host should not have to be involved with the basic communication functionality of the communication controller.

Transmitting information over power line structure 10 requires conditioning it accordingly in order to keep disturbances to a minimum and be able to achieve higher transmission rates. The conditioning of power line structure 10 includes, for example, twisting the individual power lines of power line structure 10, the use of modified, active star points and the use of ferrites both for decoupling, as well as—in the form of so-called PLC couplers—for injecting and extracting a high-frequency, modulated carrier signal for purposes of information transmission. A conditioning of this kind of power line structure 10 is described in German Applications DE 101 42 409 A1 and DE 101 42 410 A1, to which specific reference is made in this regard.

A transmission of information over data bus structure 9 in accordance with the FlexRay transmission protocol is especially suited for implementing the present invention, since this protocol already makes possible a multi-channel operation, in the case of the present invention, it being possible to utilize one channel for transmitting information over data bus structure 9 and another channel for transmitting information over power line structure 10. Other transmission protocols, which initially merely support a single-channel operation, can be expanded with relatively little outlay to likewise support a multi-channel operation. Moreover, the FlexRay protocol is especially suited, since it provides for all components of the communications system to be connected to the power line structure, so that, without entailing any additional expenditure for connections, each of the components can be reached over the power line structure due to the redundant transmission of information. The physical layer of the communications system can be designed to be electrical or optical.

To implement the method according to the present invention, the information transmitted within the time windows over data bus structure 9 is routed both via bus transceivers 5, as well as at least partially via PLC transceivers 6. PLC transceivers 6 modulate the information signal to be transmitted and demodulate the received, modulated information signal. The modulated information signal is inductively injected via a PLC coupler into the twisted power lines (battery voltage $U_{Batt}$ and ground GND), symmetrically transmitted, and extracted on the receiver side via the mentioned PLC couplers. In the case of the PLC couplers, ferrites are used for the high-frequency decoupling of all components 2, 3, 4 of communications system 1 on the relevant power line and thereby ensure a constant termination over the entire transmission bandwidth that is adapted to the characteristic wave impedance (compare, e.g., German Patent Application No. DE 101 42 409 A1). These measures are, in fact, highly recommended, but, depending on the attainable data rate, the carrier frequency, the line length, network structure and other parameters, are not absolutely necessary. The described measures are necessary, however, for a so-called High Date Rate (HDR) PLC information transmission.

One preferred network topology for the preferably employed HDR-PLC information transmission is the star topology (compare, e.g., German Patent Application No. DE 101 42 410 A1). In this case, one uses modified star points which do not influence the d.c. current. Here, in turn, the use of ferrites presents itself, since they do not have a resistance value for a frequency of f=0 Hz. For this reason, double-aperture core ferrites are used for series resistors $S_{series}$ to produce frequency-dependent resistances. Since the carried information signal is subject to a high signal attenuation by the passive star points, the star points are preferably designed to be active. The carried information signal is extracted by PLC couplers, upstream from the low-impedance star point. The information signal is distributed on the other side of the star point, again via PLC couplers, into the circuits in question, by driver stages (bidirectional, half-duplex, i.e., the signal must not be injected into the original circuit). For the driver stage, an amplifier stage or even a complete transceiver may be optionally used.

Given an active design of the star points due to the additionally introduced capacitive coupling of the star points (between star point $U_{Batt}$ and star point GND), $2*Z_{series}/2$ no longer corresponds to $Z_{series}$ in a passive design (compare, e.g., German Patent Application No. DE 101 42 410 A1). For active start points, $Z_{series}=Z_L$ must then apply, $Z_{series}$ being the series resistances and $Z_L$ the characteristic wave impedances which are used to terminate the circuit branches.

Figure 2:
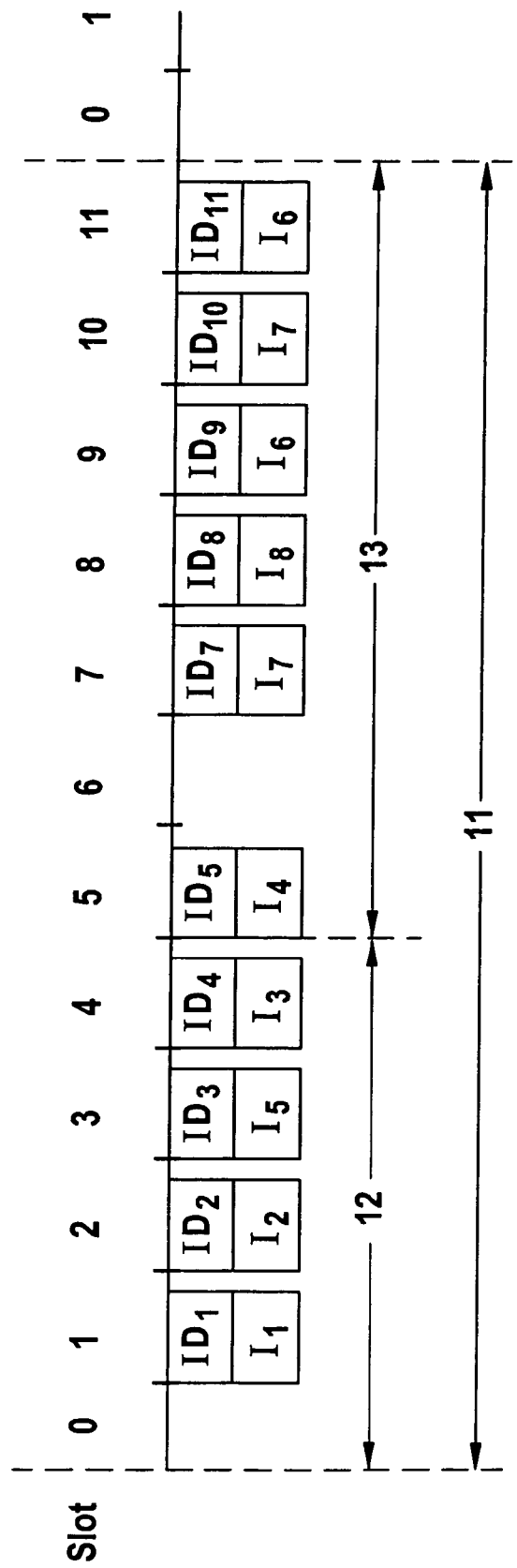
FIG. 2 shows is a FlexRay communications cycle.

A communications cycle according to the FlexRay protocol is shown exemplarily in FIG. 2. The cycle is denoted in its entirety by reference numeral 11. Cycle 11 includes a static segment 12 and a dynamic segment 13. In addition to segments 12 and 13, cycle 11 may also include other segments, for example a symbol window or a so-called Network Idle Time (NIT). Communications cycle 11 repeats itself periodically. Static segment 12 includes at least two static slots, in the present example, four static slots. Within static segment 12, a static Time Division Multiple Access (TDMA) scheme is used for coordinating the various information transmissions. In static segment 12, all slots have the same, statically predefined duration, and all messages (frames), which contain information to be transmitted, have the same, statically predefined length.

In the exemplary embodiment of FIG. 2, communications cycle 11 is subdivided into twelve slots, slots 0 through 4 being assigned to static segment 12 and slots 6 through 11 to dynamic segment 13. The messages to be transmitted in slots 1 through 4 are assigned by their identifiers $ID_1$ through $ID_4$ to corresponding slots #1 through #4. The information contained in the messages is denoted by $I_1$ through $I_3$ and $I_5$.

Dynamic segment 13 of cycle 11 is subdivided into a predefinable number of minislots of the same duration. Moreover, dynamic segment 13 includes a predefinable number of dynamic slots which include one or more minislots. The duration of a dynamic slot depends on whether a communication, i.e., the transmission or the receipt of a message takes place or not. The duration of a dynamic slot is specified separately for each channel. At the end of each minislot, it is ascertained whether a communication is taking place or not. If no communication is taking place, then the dynamic slot includes merely one minislot, i.e., the corresponding communication channel is idle for the duration of the entire minislot. The dynamic slot includes a plurality of minislots in the case that a communication is taking place.

Quite generally, it can be ascertained that components 2, 3, 4 are able to transmit event-controlled information within dynamic segment 13. Effectively, therefore, within each cycle 11, a certain transmission duration, i.e., a specific number of slots, is reserved for an event-controlled information transmission. If an event occurs during cycle 11 which triggers an information transmission, the corresponding information may be transmitted during dynamic segment 13 of this or of a subsequent cycle 11. If, however, no event-controlled information transmission takes place in cycle 11, then dynamic segment 13 remains unused in this cycle 11 (compare slot #6). In the present exemplary embodiment of FIG. 2, messages $ID_5$ through $ID_{11}$ are transmitted in the dynamic segment with information $I_4$ and $I_6$ through $I_8$.

In accordance with the present invention, in the exemplary embodiment illustrated in FIG. 2, not all messages $ID_1$ through $ID_{11}$, but merely messages $ID_1$ through $ID_4$ are not only transmitted over data bus structure 9, but also over power line structure 10.

Figure 3:
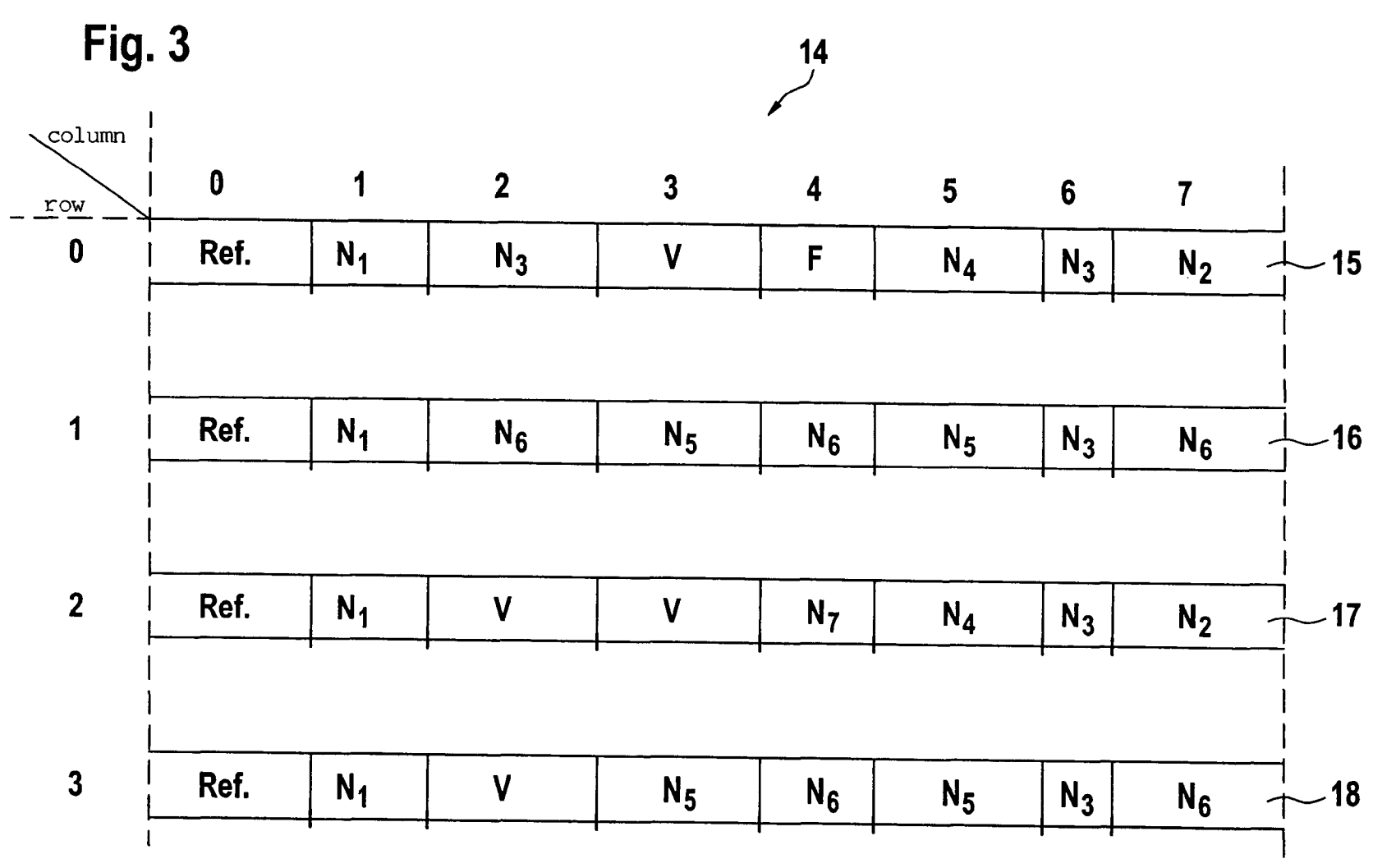

In FIG. 3, a so-called system matrix, as is used in an information transmission in accordance with the TTCAN protocol, is denoted in its entirety by reference numeral 14. System matrix 14 includes a plurality of rows #0 through #3, each row corresponding to a basic cycle 15 through 18. Each cycle 15 through 18 is subdivided into a specific number of time windows. The number and duration of the individual time windows may vary within a cycle 15 through 18, however, is the same for each cycle 15 through 18. In the exemplary embodiment of FIG. 3, each cycle 15 through 18 is subdivided into eight time windows #0 through #7.

In accordance with the TTCAN protocol, there are various types of time windows. A different type of time window may be selected from cycle to cycle. Thus, for example, there are so-called exclusive time windows $N_i$, which are assigned to specific messages $N_i$, which are periodically transmitted to data bus structure 9 without competing for the access rights. Moreover, there are so-called arbitrating time windows V, which may be used for event-controlled information transmission. Finally, there are also so-called free time windows F, which enable system matrix 14 to be adapted to an expanded communication or network structure without entailing substantial outlay. The originally free time windows may then be used for the additional information transmission in the case of an expansion of communications system 1 by additional components or in the case of an additional information transmission of existing components 2, 3, 4.

Thus, within exclusive time windows $N_i$, information is transmitted in a time-controlled manner. Arbitrating time windows V are used for an event-controlled information transmission within a cycle 15 through 18.

In accordance with the present invention, in the exemplary embodiment illustrated in FIG. 3, not all messages, but rather merely messages $N_1$ through $N_7$, which are transmitted in the time windows (exclusive windows) over data bus structure 9, are also transmitted over power line structure 10.

What is claimed is:

1. A method for transmitting information in a motor vehicle among electrical components of the motor vehicle, which are connected to a data bus structure of the motor vehicle in order to transmit information and to a power line structure of the motor vehicle in order to be supplied with power, comprising:

transmitting the information in successive, pre-allocated communication cycles over the data bus structure, each cycle of the successive cycles including at least one time window for transmitting a first set of the information at specific points in time and at least one event window for transmitting a second set of the information, which is different from the first set of information, in response to specific events; and contemporaneously with the transmitting of the first set of the information in the at least one time window, transmitting at least one portion of the first set of the information transmitted in the at least one time window over the power line structure, thereby causing redundant information transmission, wherein:

only the information from the first set of the information which is transmitted within the at least one time window over the databus structure is also transmitted over the powerline structure, and the power line structure is not used to transmit the second set of information transmitted during the at least one event window.

2. The method as recited in claim 1, wherein the information is transmitted over the data bus structure in accordance with a Time-Triggered Controller Area Network (TTCAN) protocol.

3. The method as recited in claim 1, wherein the information is transmitted over the data bus structure in accordance with a FlexRay protocol.

4. The method as recited in claim 1, wherein the information is transmitted over the data bus structure in accordance with a Time-Triggered Protocol (TTP).

5. A method for transmitting information in a motor vehicle among electrical components of the motor vehicle, which are connected to a data bus structure of the motor vehicle in order to transmit information and to a power line structure of the motor vehicle in order to be supplied with power, comprising:

transmitting at least some information both via the data bus structure and via the power line structure, in order to provide redundant information transmission;

wherein the information is transmitted in successive, pre-allocated communication cycles over the data bus structure, each cycle of the successive cycles including at least one time window for transmitting a first set of the information at specific points in time and at least one event window for transmitting a second set of the information, which is different from the first set of information, in response to specific events, and wherein at least one portion of the first set of the information transmitted in the at least one time window over the data bus structure is transmitted over the power line structure contemporaneously with the transmitting of the first set of the information in the at least one time window, wherein only the information from the first set of the information which is transmitted within the at least one time window over the databus structure is also transmitted over the powerline structure, wherein the first set of information includes at least one of time-critical information and safety-critical information and the second set of information includes information that is generated at unpredictable times, and wherein the power line structure is not used to transmit the second set of information transmitted during the at least one event window.

6. A communications system for a motor vehicle, the motor vehicle including a plurality of electrical components, a data bus structure to which the components are connected for transmitting information among the components and a power line structure to which the components are connected in order to be supplied with power, the communication system comprising:

an arrangement configured to transmit the information in successive, pre-allocated communication cycles over the data bus structure, each cycle of the successive cycles including at least one time window for transmitting a first set of the information at specific points in time and at least one event window for transmitting a second set of the information, which is different from the first set of information, in response to specific events, the arrangement further configured to redundantly transmit at least some of the first set of the information transmitted in the at least one time window over the data bus structure over the power line structure, wherein the redundant transmission occurs contemporaneously with the transmitting of the information in the at least one time window, wherein only the information from the first set of the information which is transmitted within the at least one time window over the databus structure is also transmitted over the powerline structure, and wherein the power line structure is not used to transmit the second set of information transmitted during the at least one event window.

7. The communications system as recited in claim 6, wherein the information is transmitted over the data bus structure in accordance with a Time-Triggered Controller Area Network (TTCAN) protocol.

8. The communications system as recited in claim 6, wherein the information is transmitted over the data bus structure in accordance with a FlexRay protocol.

9. The communications system as recited in claim 6, wherein the information is transmitted over the data bus structure in accordance with a Time-Triggered Protocol.

10. A communications system for a motor vehicle, the motor vehicle including a plurality of electrical components, a data bus structure to which the components are connected in order to transmit information among the components, and a power line structure to which the components are connected in order to be supplied with power, the communication system comprising:

an arrangement configured to transmit at least some of the information both via the data bus structure and via the power line structure, the information being transmitted in successive, pre-allocated communication cycles over the data bus structure, each cycle of the successive cycles including at least one time window for transmitting a first set of the information at specific points in time and at least one event window for transmitting a second set of the information, which is different from the first set of information, in response to specific events, wherein the arrangement is further configured to redundantly transmit at least one portion of the first set of the information transmitted in the at least one time window over the data bus structure over the power line structure, wherein the redundant transmission occurs contemporaneously with the transmitting of the first set of the information in the at least one time window wherein only the information from the first set of the information which is transmitted within the at least one time window over the databus structure is also transmitted over the powerline structure, and wherein the power line structure is not used to transmit the second set of information transmitted during the at least one event window.

11. The communications system as recited in claim 10, wherein the power line structure is not used to transmit information that is transmitted during the at least one event window.

* * * * *